No. 786,787. PATENTED APR. 4, 1905.
M. F. HUDSON & E. R. LANGFORD.
VISE.
APPLICATION FILED MAR. 22, 1904.
2 SHEETS—SHEET 1.
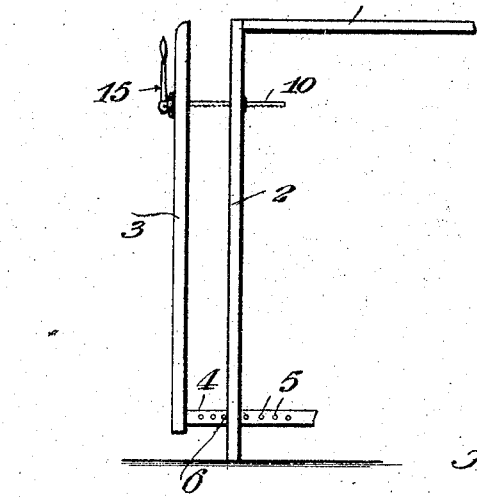
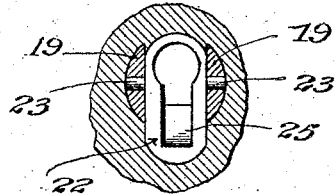
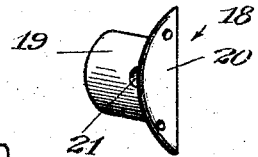
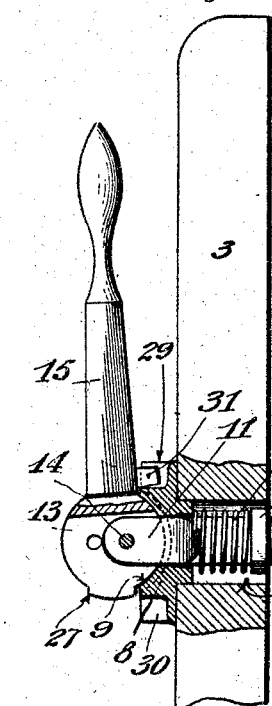
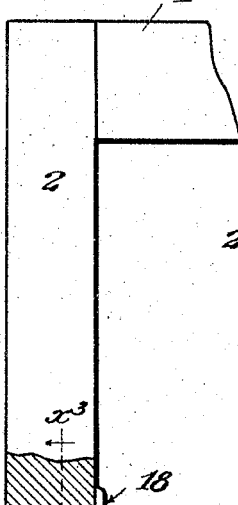
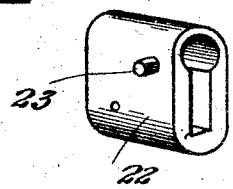
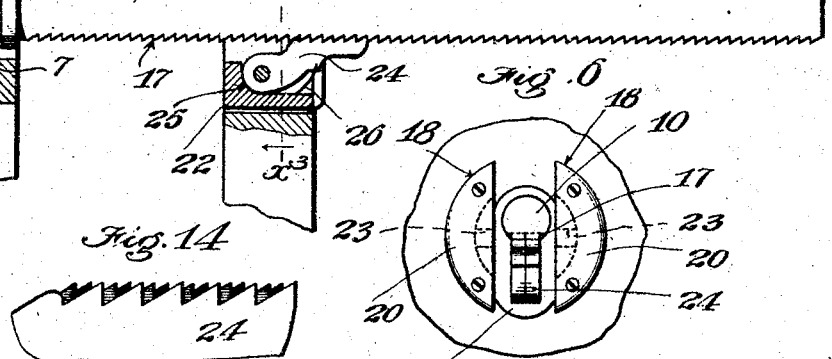
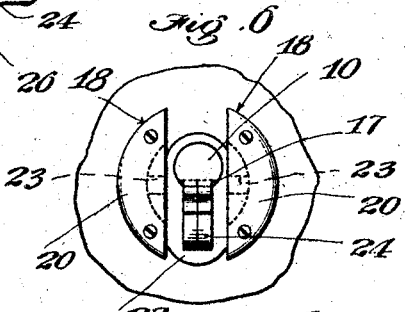
Witnesses
Inventors
Millard F. Hudson
Edwin R. Langford
by Townsend Bros
attys No. 786,787. PATENTED APR. 4, 1905.
M. F. HUDSON & E. R. LANGFORD.
VISE.
APPLICATION FILED MAR. 22, 1904.
2 SHEETS—SHEET 2.
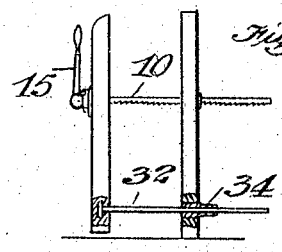
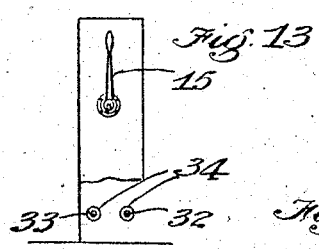
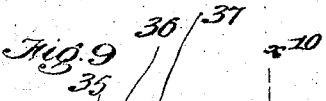
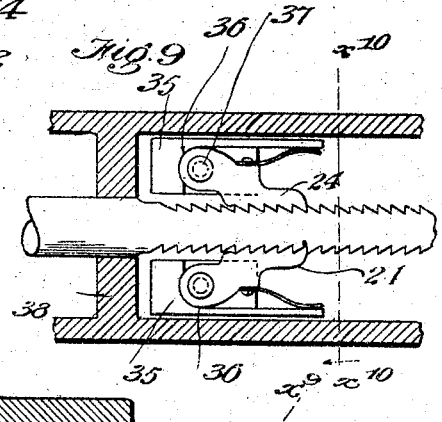
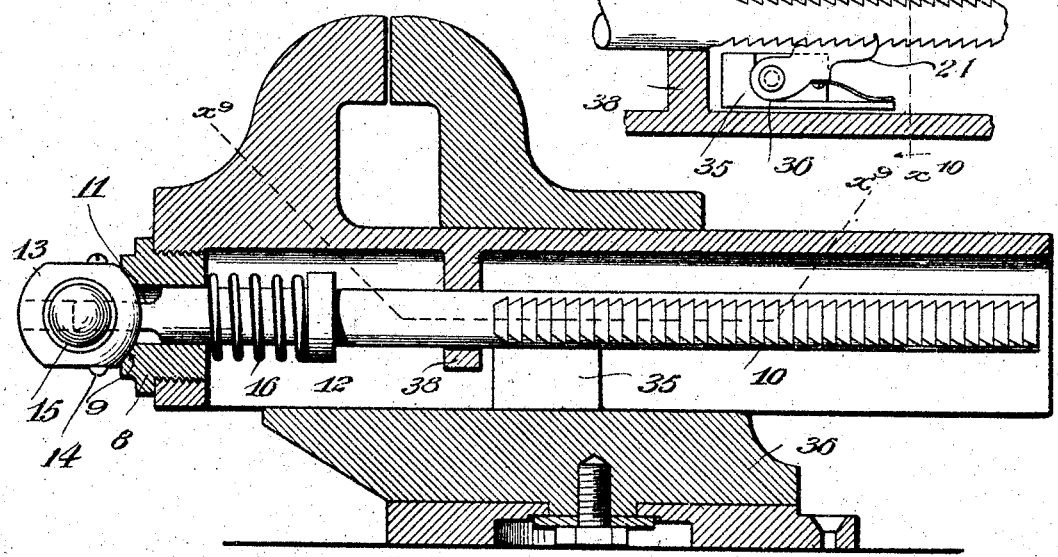
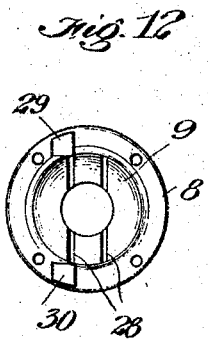
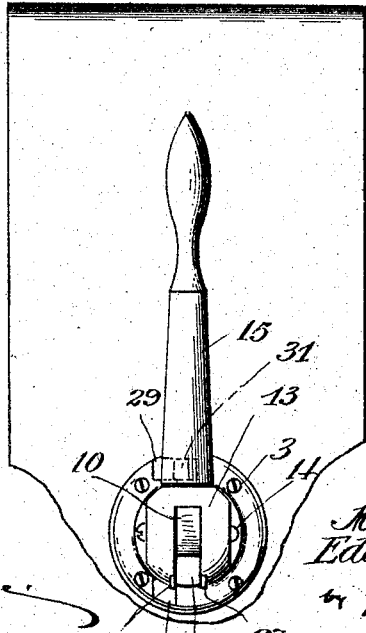
Witnesses
Inventors
Millard F. Hudson
Edwin R. Langford
by Townsend Bros.
attys No. 786,787.  
Patented April 4, 1905.

UNITED STATES PATENT OFFICE.

MILLARD F. HUDSON AND EDWIN R. LANGFORD, OF LOS ANGELES, CALIFORNIA, ASSIGNORS TO HUDSON TOOL COMPANY, OF LOS ANGELES, CALIFORNIA.

VISE.

SPECIFICATION forming part of Letters Patent No. 786,787, dated April 4, 1905.

Application filed March 22, 1904. Serial No. 199,329.

*To all whom it may concern:*

Be it known that we, MILLARD F. HUDSON and EDWIN R. LANGFORD, citizens of the United States, residing at Los Angeles, in the county of Los Angeles and State of California, have invented a new and useful Vise, of which the following is a specification.

This invention may be embodied in carpenters' vises, cabinet-makers' vises, machinists' vises, jewelers' vises, blacksmiths' vises, and, in fact, in all forms of vises.

The main object of the invention is to provide for a quick adjustment and clamping of the movable jaw, doing away with a screw, as employed in the ordinary form of vise. Where a screw is employed and the loose jaw has to be moved a considerable distance, a great many turns of the screw are required to move the jaw the requisite distance. This consumes much time; but in the present invention by a simple movement of a lever the jaw is released and freed, so as to be quickly moved in or out as occasion demands, and another movement of the lever suffices to clamp the jaw—that is, force it with great power toward the other jaw and wedge the work tightly between the two jaws.

The invention in its construction embraces a rack-bar which is adapted to be engaged by a series of detents, each detent preferably having a series of teeth; and another object is to secure a close adjustment by the serial arrangement of the teeth of the detents with the rack-bar.

Another object is to provide means whereby it is impossible for the operator to strain the rack against the detents to force the jaw unless the rack has been so turned that it is in perfect engagement with the detents. This prevents stripping of the teeth of either detents or rack-bar.

Other objects of the invention will be brought out in the detailed description.

The accompanying drawings illustrate the invention, and, referring to the same—

Figure 1 is a side elevation of a carpenter's vise constructed in accordance with this invention. Fig. 2 is a side elevation, enlarged, partly in section, of the upper portion of the vise illustrated in Fig. 1. Fig. 3 is a section on line $X^3 X^3$, Fig. 1, with the rack-bar and detents removed. Fig. 4 is a perspective view of one member of the divided bushing. Fig. 5 is a perspective view of the detent-carrier. Fig. 6 is a rear elevation of that portion of Fig. 2 surrounding the rack-bar and is taken in a direction looking from the back edge of the bench toward the back of the vise. Fig. 7 is a side elevation of a cabinet-maker's vise constructed in accordance with this invention. Fig. 8 is a vertical section taken through a machinist's vise longitudinally of the rack-bar, the latter being shown in elevation, together with the operating-lever. Fig. 9 is a section taken on line $X^9 X^9$, Fig. 8. Fig. 10 is a section on line $X^{10} X^{10}$, Fig. 9. Fig. 11 is a front elevation of what is shown in Fig. 2. Fig. 12 is a front elevation in detail of the face-plate. Fig. 13 is a front elevation of the vise shown in Fig. 7. Fig. 14 is an enlarged detail of a portion of three detents, showing the serial arrangement of their teeth.

Referring to Figs. 1 and 2 and adjacent detail views, 1 designates the top of the bench, and 2 is the rear and stationary jaw of the vise. 3 is the movable jaw, the bottom of which has the ordinary bar 4, provided with holes 5 for receiving a pin 6, which rests against the lower part of the rear jaw 2 and holds the movable jaw 3 substantially parallel with the rear jaw.

The movable jaw 3 is provided with a hole 7 near its upper end, and an annular bearing-plate 8 is fitted to the hole and has a concave seat 9, the bearing-plate 8 being fastened to the jaw 3 by suitable screws, as shown.

A rack-bar 10 passes through both jaws of the vise, and its front end is preferably flattened to form a tongue 11, which projects through the bearing-plate 8 and somewhat beyond the same. A collar 12 is provided on the rack-bar 10 a short distance from the tongue 11. A spheroidal cam 13, having flattened sides, is pivoted by a pin 14 to the tongue 11, the cam being slotted to receive the tongue and its rear face being convex to fit the concave seat of the bearing-plate 8. A suitable lever 15 is provided for operating the cam. A coil compression-spring 16 is interposed between the collar 12 and the bearing-plate 8.

The rack-bar 10 is provided with teeth 17 along its edge, and the edge of a tooth, as shown in Fig. 6, lies on a chord of a sectional plane of the rack-bar.

A divided bushing 18, comprising two members, is arranged in the stationary jaw 2. Each member of the bushing comprises a cheek-piece 19, having a flange 20 and a recess 21, and the two members are oppositely arranged in the stationary jaw 2, with their flanges 18 resting against the rear face thereof, being fastened thereto by suitable screws.

A detent-carrier 22, comprising a housing which is provided with trunnions 23, is mounted within the stationary jaw 2 between the two members of the bushing 18, the trunnions of the detent-carrier resting within the recesses 21 in the bushing 18. The detent-carrier 22 closely but slidably fits between the two members of the bushing, and the convex faces of the detent-carrier do not touch the upper and lower walls of the recess in the stationary jaw, there being a slight space above and below the detent-carrier, so that the latter may tilt slightly on its trunnion-pivots.

A plurality of detents 24, having serially-arranged teeth, are pivoted inside the detent-carrier 22, and their hubs bear against a concave seat 25, formed, preferably, integral with the bottom wall of the detent-carrier 22. The detents 24 are provided with suitable springs 26, which tilt them upwardly, so that one detent is in engagement with the teeth on the rack-bar when the rack-bar is in the position shown in Fig. 2.

It is obvious that by turning the cam 13 on its pivot 14 the rack-bar 10 will be strained and the movable jaw 3, together with its attachments, will be moved toward the stationary jaw, thereby squeezing the work between the two jaws, and that by swinging the cam-lever 15 back into the position shown in Fig. 2 the jaw 3 will be released and will free the work, the spring 16 always keeping the cam 13 against the conical seat 9.

When it is desired to adjust the movable jaw to a desired position, the cam-lever 15 is rocked in a plane substantially parallel to the face of the jaw 3, which turns the rack-bar 10 and rotates its teeth away from the detents 24, so that when the cam-lever 15 has been turned a quarter of a circle the detents 24 will bear against the smooth part of the rack-bar 10, thereby giving absolute freedom of movement of the movable jaw and allowing it to be pulled out or pushed in to the required position. To again engage the detents, the cam-lever 15 is rocked back to rotate the rack-bar 10, which brings the teeth of the rack-bar again into engagement with the teeth of one of the detents, whereupon the cam-lever 15 is then swung on its pivot 14 and the cam forces in the movable jaw 3 and grips the work.

A pair of lugs 27 project from the cam 13, and the conical face of the face-plate 8 is provided with two grooves 28, which are adapted to receive the lugs 27 when the lever is rocked on the pivot 14. When the cam-lever is in a vertical position with respect to the rack-bar, as shown in Fig. 2, the lugs 27 do not engage in the grooves 28, and the cam-lever is therefore free to be turned to rotate the rack-bar 10; but when the rack-bar 10 has been turned so that the detents engage the teeth of the rack-bar the lugs 27 stand directly in register with the grooves 28, so that at such time the lever may be tilted to strain the rack-bar to clamp the work. This prevents a careless workman from operating the cam and clamping the work, and thereby straining the rack-bar when the teeth of the rack-bar are not properly in position to engage the detents. Without this device a careless workman might only partially rotate the rack-bar, so that only the corners of the teeth of the rack-bar were in engagement with the detents, and if he then operated the cam it would result in shearing or breaking off the corners of the teeth of the rack-bar.

In order to stop the cam-lever at the proper position with the lugs 27 in register with the grooves 28, stop-lugs 29 and 30 are provided on the face-plate 8, and a lug 31 projects from the cam-lever 15.

It is obvious that it may be desired at some time to have the lever 15 work on the lower part of the circle, in which case it will be reversed upon the tongue 11, and at such time the lug 30 will perform the function of the lug 29.

As the rack-bar 10 is turned its round shank sweeps over the teeth of the detents and depresses the detents, and as the detents tilt downwardly it is obvious that the rearmost tooth of the detent will be the only point of contact between a detent and the round smooth shank of the rack-bar, and in order to prevent the back teeth of the detents from cutting or scoring the rack-bar the back teeth are preferably slightly rounded, as shown.

The manipulation of the movable jaw in the carpenter's vise (shown in Fig. 1) will not be confined to the upper part, as it is obvious that the pin 6 must be changed to the proper hole in the bar 4 to give the proper angular position of the movable jaw with respect to the stationary jaw; but in the cabinet-maker's form of vise (shown in Fig. 7) the manipulation is confined exclusively to the rack-bar and cam device, as the movable jaw is always maintained in a parallel position with the stationary jaw through the medium of rods 32 and 33, which project from the movable jaw and slide in thimbles 34 on the stationary jaw.

Where extreme strength and solidity are required, as is very desirable in the machinist's form of vise, (shown in Fig. 8,) it is preferred to provide teeth on both sides of the rack-bar, as shown in Fig. 9, and to employ two sets of detents, one set for each series of teeth. The detents are supported by a pair of blocks 35, which have concave seats 36 for receiving the end thrust of the detents and relieving the strain upon the pivots 37 of the detents. The blocks 35 are preferably cast integral with the base 36.

In order to guide the rack-bar and hold it in position, a block 38 is provided which projects down from the beam of the movable jaw. In other respects the device is similar to that previously described, although the face-plate 8 is made somewhat thicker, as shown, and the cam-lever is illustrated as working from the horizontal to the vertical—that is, when the cam-lever is in the horizontal position the teeth of the rack-bar are in engagement with the two sets of detents and when in vertical position the two sets of detents are spread apart and rest against the opposite smooth portions of the shank of the rack-bar. In this form of vise it will be seen that the strength is doubled. Moreover, there is no lateral strain upon the rack-bar tending to tilt it, which is concomitant with the construction shown in Fig. 2, as in that construction the tendency of the rack-bar when under strain is to tilt upwardly, which of course is resisted by the detent-carrier 22.

When the cam-lever is swung on its pivot 14, the slight necessary tilting action of the rack-bar 10 is provided for by the clearance-space between the detent-carrier 22 and the movable jaw, as shown, and it will be noticed that a small clearance-space has been provided in the bearing-plate 8, although this clearance-space is much less than the clearance-space at the stationary jaw, as the movement of the rack-bar is greater at that point than at the movable jaw.

While we have shown and described several embodiments of our invention, it should be understood that the device is susceptible of other arrangements than those shown without departing from the spirit of the invention.

What we claim is—

1. A stationary jaw, a movable jaw, a rack-bar revolubly mounted in the movable jaw, a plurality of detents carried by the stationary jaw for engaging the rack-bar, the detents being serially arranged for sequentially engaging the teeth of the rack-bar, a cam pivoted to the rack-bar and having a convex face, a face-plate on the movable jaw having a concave seat for the cam, and a lever for operating the cam.

2. A stationary jaw, a movable jaw, a rack-bar revolubly mounted in the movable jaw, a plurality of detents carried by the stationary jaw for engaging the rack-bar, a cam pivoted to the rack-bar, means on the movable jaw for receiving the thrust of the cam, a lever for operating the cam, and means for limiting the operation of the cam to a definite position of the rack-bar.

3. A stationary jaw, a movable jaw, a rack-bar revolubly mounted in the movable jaw, a plurality of detents carried by the stationary jaw for engaging the rack-bar, a bearing-plate on the movable jaw for receiving the thrust of the cam, a lug on the cam, the bearing-plate having a groove for receiving the lug.

4. A stationary jaw, a movable jaw, a rack-bar revolubly mounted in the movable jaw, a plurality of detents carried by the stationary jaw for engaging the rack-bar, a bearing-plate on the movable jaw for receiving the thrust of the cam, a lug on the cam, the bearing-plate having a groove for receiving the lug, and means for limiting the turning of the rack-bar.

5. A stationary jaw, a movable jaw, a rack-bar revolubly mounted in the movable jaw, a plurality of detents carried by the stationary jaw for engaging the rack-bar, a bearing-plate on the movable jaw for receiving the thrust of the cam, a lug on the cam, the bearing-plate having a groove for receiving the lug, a lug on the face-plate, a cam-lever for operating the cam, and a lug on the cam-lever for engaging with the lug on the face-plate.

6. A stationary jaw, a movable jaw, a rack-bar revolubly mounted in the movable jaw, a series of teeth arranged on opposite sides of the rack-bar, a plurality of detents for engaging the teeth on both sides of the rack-bar, and a cam on the rack-bar for tightening the movable jaw.

7. A stationary jaw, a movable jaw, a rack-bar revolubly mounted in the movable jaw, said rack-bar having teeth formed on its opposite sides, a plurality of detents engaging the rack on both sides, and means for tightening the movable jaw.

8. A plurality of jaws, means for supporting the jaws adjustably with respect to each other, a rack-bar connected to one jaw, a detent-carrier pivotally connected with the other jaw, a detent on the carrier for engaging the rack-bar, and means for turning the rack-bar into or out of engagement with the detent and for tightening the jaws.

9. A plurality of jaws, means for supporting the jaws adjustably with respect to each other, a rack-bar connected to one jaw, a divided bushing connected with the other jaw, a detent-carrier pivoted between the cheek-pieces of the bushing, the rack-bar passing through the detent-carrier, a detent on the carrier for engaging the rack-bar, and means for turning the rack-bar into or out of engagement with the detent and for tightening the rack-bar.

10. A plurality of jaws, means for supporting the jaws adjustably with respect to each other, a rack-bar connected to one jaw, a detent-carrier pivotally connected with the other jaw, the rack-bar passing through the carrier, a detent on the carrier having a hub which bears in a rounded seat in the carrier, and
5 means for turning the rack-bar into or out of engagement with the detent and for tightening the jaws.

In testimony whereof we have hereunto signed our names to this specification, in the presence of two subscribing witnesses, at Los Angeles, in the county of Los Angeles and State of California, this 16th day of March, 1904.

MILLARD F. HUDSON.
    EDWIN R. LANGFORD.

Witnesses:
 GEORGE T. HACKLEY,
 JULIA TOWNSEND.